United States Patent
Chen

(10) Patent No.: US 9,758,206 B2
(45) Date of Patent: Sep. 12, 2017

(54) MOBILE POWER PACK FIXED IN A STEERING PIPE OF A BICYCLE

(71) Applicant: NECO TECHNOLOGY INDUSTRY CO., LTD., Taichung (TW)

(72) Inventor: Ching-Hui Chen, Taichung (TW)

(73) Assignee: Neco Technology Industry Co., Ltd., Taichung (TW)

( * ) Notice: Subject to any disclaimer, the term of this patent is extended or adjusted under 35 U.S.C. 154(b) by 160 days.

(21) Appl. No.: 14/975,102

(22) Filed: Dec. 18, 2015

(65) Prior Publication Data

US 2016/0332689 A1    Nov. 17, 2016

(30) Foreign Application Priority Data

May 14, 2015   (TW) .............................. 104207377 U

(51) Int. Cl.
*B62K 19/32*   (2006.01)
*B62J 99/00*   (2009.01)
*B62K 19/40*   (2006.01)

(52) U.S. Cl.
CPC ............... *B62J 99/00* (2013.01); *B62K 19/32* (2013.01); *B62K 19/40* (2013.01); *B62J 2099/004* (2013.01)

(58) Field of Classification Search
CPC ................... B62K 19/40; B62K 19/32
See application file for complete search history.

(56) References Cited

U.S. PATENT DOCUMENTS

| 2007/0007063 A1* | 1/2007 | Okamoto | ................. B62M 6/90 180/206.4 |
| 2011/0042156 A1* | 2/2011 | Vincenz | ................. B62H 5/001 180/206.5 |
| 2013/0216885 A1* | 8/2013 | Kawatani | ............ H01M 2/1083 429/100 |

FOREIGN PATENT DOCUMENTS

CN     204161580 U   *   2/2015

* cited by examiner

*Primary Examiner* — Thienvu Tran
*Assistant Examiner* — Pinping Sun
(74) *Attorney, Agent, or Firm* — Wang Law Firm, Inc.

(57) ABSTRACT

A mobile power pack fixed in a steering pipe of a bicycle includes a housing, a quick lock device, a fixing assembly, a mobile power source and a cover. The quick lock device is mounted on the connecting portion of the housing. The fixing assembly has a first fixing member inserted through the second receiving chamber and exposed out of the connecting portion to lock with the quick lock device, and first fixing member is screwed in the second fixing member. The quick release blocks of the quick lock device are pushed outward by the first fixing member to press against an inner surface of the steering pipe, so that the mobile power pack can be fixed in or released from a first receiving chamber of the steering pipe by the housing.

5 Claims, 6 Drawing Sheets

MOBILE POWER PACK FIXED IN A STEERING PIPE OF A BICYCLE

CROSS REFERENCE TO RELATED APPLICATION

This application claims the benefit of priority to TW 104207377, filed on May 14, 2015 with the Intellectual Property Office of the Republic of China, Taiwan, the entire specification of which is incorporated herein by reference.

BACKGROUND OF THE INVENTION

Field of the Invention

The present invention relates to a mobile power pack, and more particularly to a mobile power pack fixed in a steering pipe of a bicycle.

Related Prior Art 3C products are very poplar today, particularly the smart phone. Smart phone brings much convenience to our daily life, and can be used anywhere to search or read information or watch video on the internet.

With the rise of environmental awareness and the gradually increase of the oil price, bicycles are gradually accepted by people as commute alternatives. Bicycles are not just a commute vehicle. Cycling can burn calorie, so people can built up fitness and lose weight by bicycling.

The present invention is aimed at how to combine 3C products with the bicycle to make the bicycle more practical.

SUMMARY

The present invention is aimed at providing a mobile power pack which is fixed in a steering pipe of a bicycle, and the mobile power pack can be provided for connection of various external 3C products, which makes the bicycle more practical.

To achieve the above objective, the present invention provides a mobile power pack fixed in a steering pipe of a bicycle, the steering pipe comprises a first receiving chamber with an open end, the mobile power pack comprises a housing, a quick lock device, a fixing assembly, a mobile power source and a cover. The quick lock device is mounted on the connecting portion of the housing. The fixing assembly has a first fixing member inserted through the second receiving chamber and exposed out of the connecting portion to lock with the quick lock device, the outer threaded section of the first fixing member is screwed in the inner threaded hole of the second fixing member. The quick release blocks of the quick lock device are pushed outward by the first fixing member to press against an inner surface of the steering pipe, so that the mobile power pack can be fixed in or released from the first receiving chamber of the steering pipe by the housing.

DETAILED DESCRIPTION

The present invention will be clearer from the following description when viewed together with the accompanying drawings, which show, for purpose of illustrations only, the preferred embodiment in accordance with the present invention.

Figure 1:
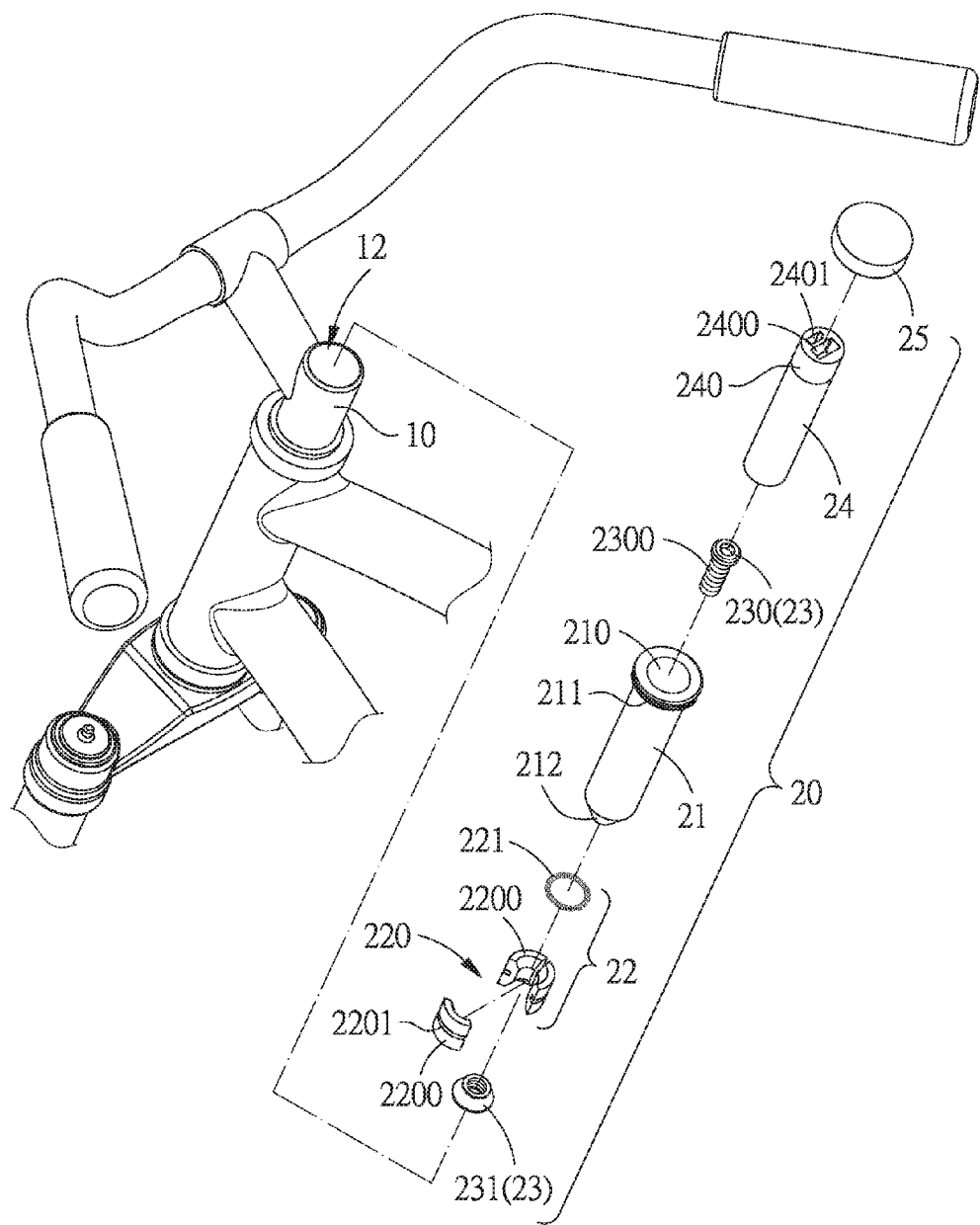
FIG. 1 is an exploded view of a mobile power pack to be fixed in a steering pipe of a bicycle in accordance with a preferred embodiment of the present invention.
Figure 2:
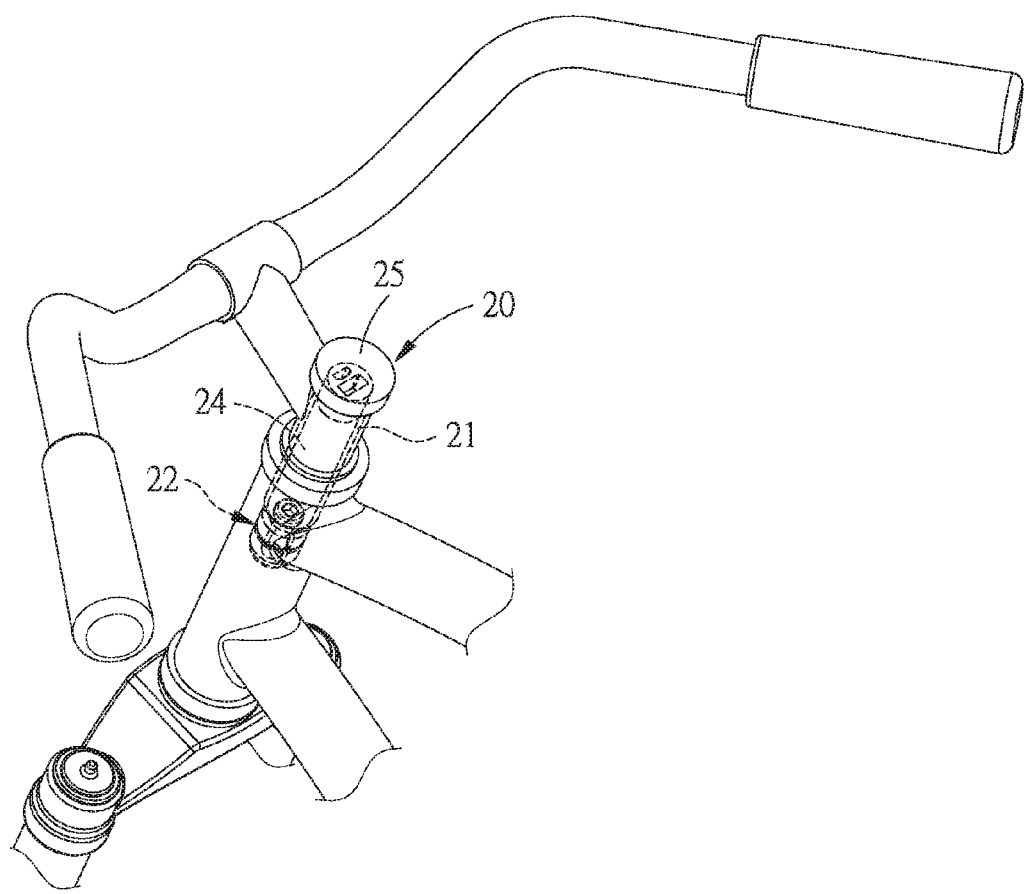
FIG. 2 is an assembly view of the mobile power pack to be fixed in a steering pipe of a bicycle in accordance with the preferred embodiment of the present invention.
Figure 3:
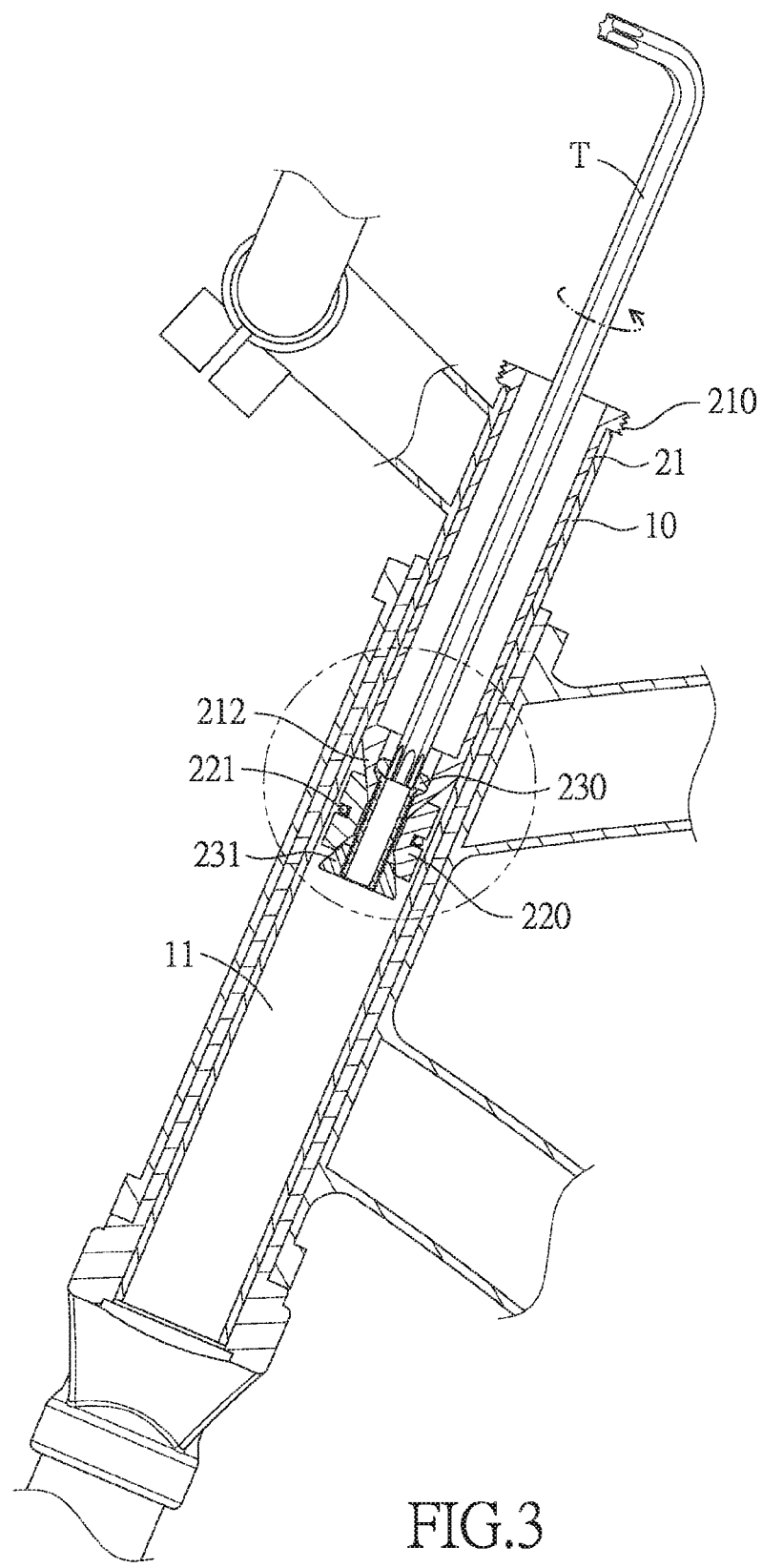
FIG. 3 is a cross sectional view of the mobile power pack to be fixed in a steering pipe of a bicycle in accordance with the preferred embodiment of the present invention.
Figure 4:
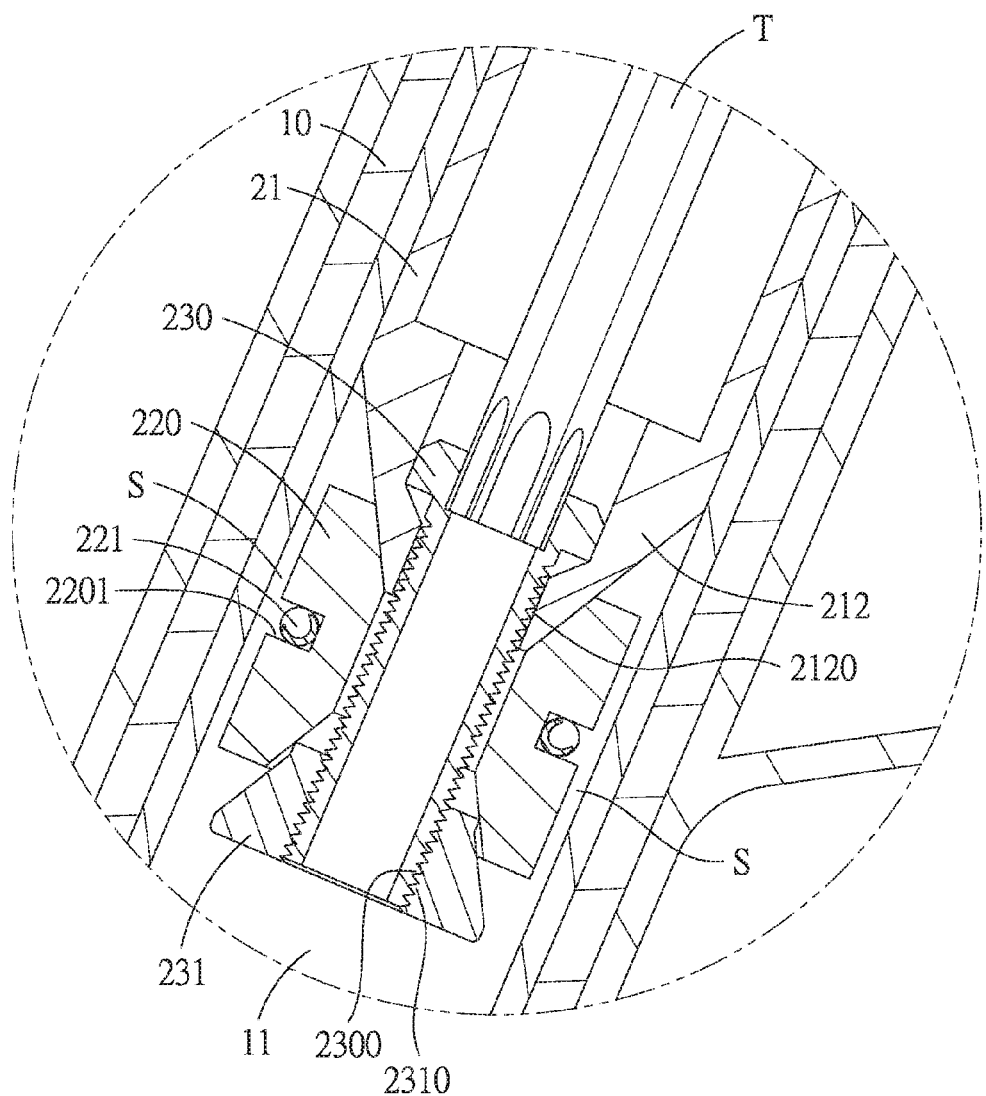
FIG. 4 is a magnified view of a part of FIG. 3.
Figure 5:
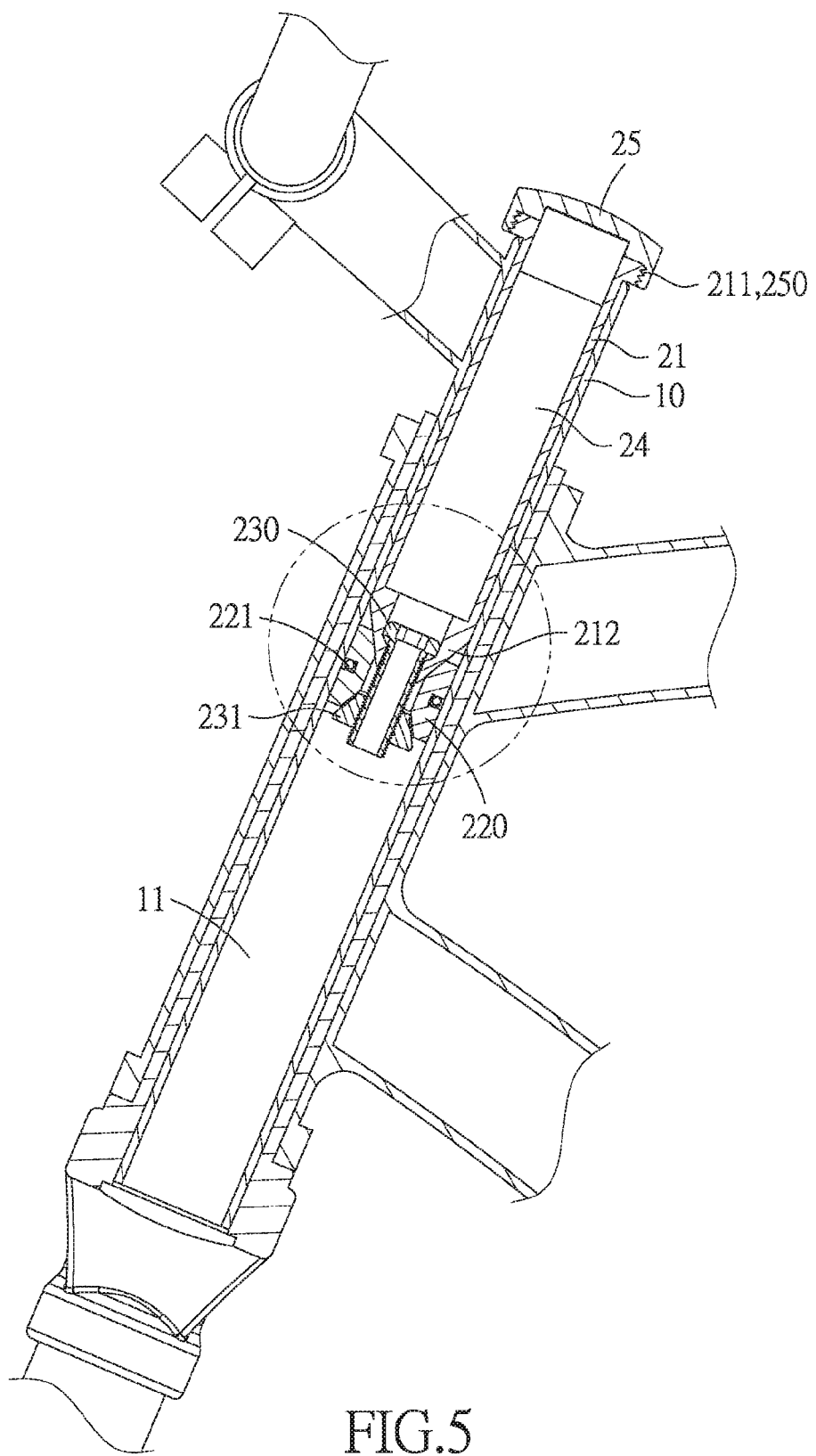
FIG. 5 is another cross sectional view of the mobile power pack to be fixed in a steering pipe of a bicycle in accordance with the preferred embodiment of the present invention.
Figure 6:
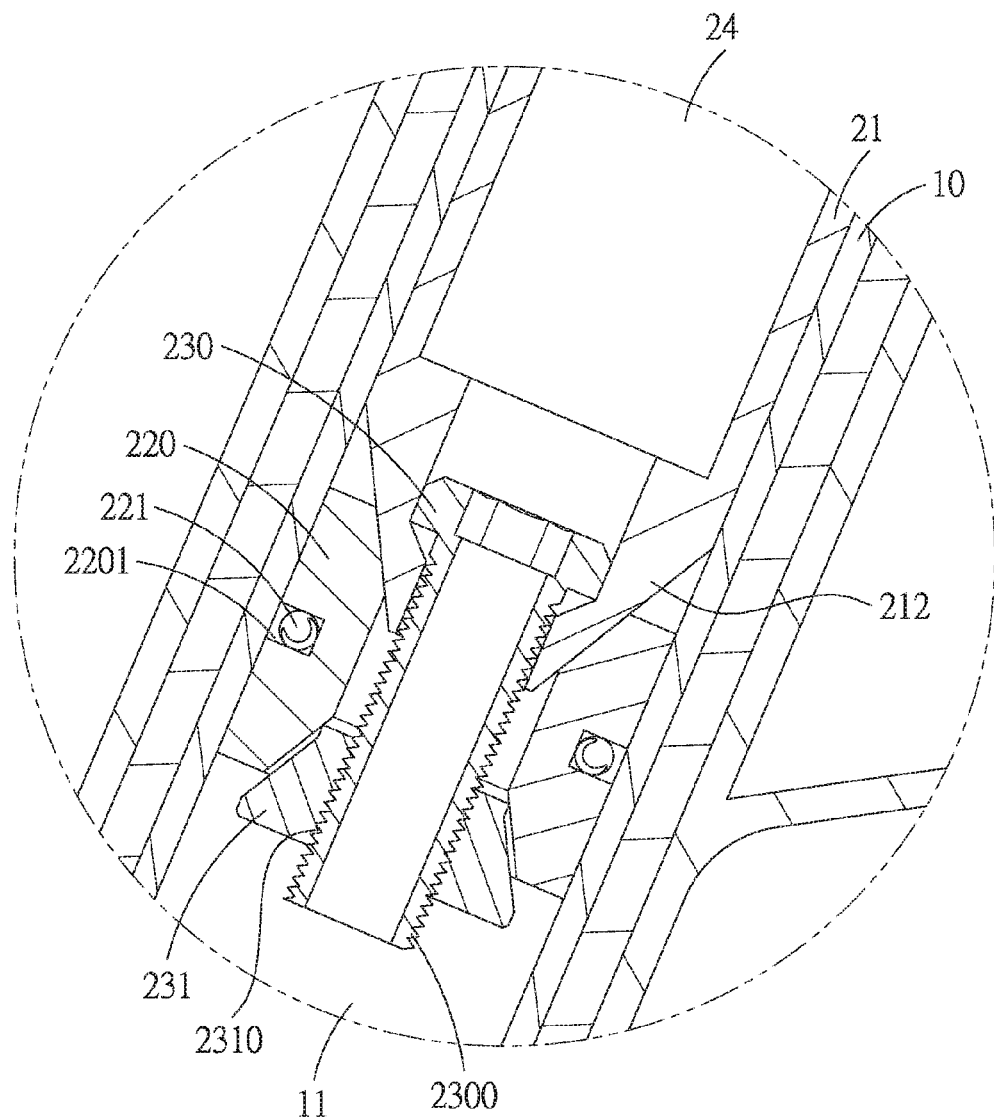
FIG. 6 is a magnified view of a part of FIG. 5.

Referring to FIGS. 1-6, a mobile power pack 20 in accordance with the preferred embodiment of the present invention is to be fixed in a steering pipe 10 of a bicycle. The steering pipe 10 includes a first receiving chamber 11 with an open end 12.

The mobile power pack 20 includes a housing 21, a quick lock device 22, a fixing assembly 23, a mobile power source 24 and a cover 25.

The housing 21 includes a second receiving chamber 210. At the top of the housing 21 is formed an outer threaded portion 211, and at the bottom of the housing 21 is a connecting portion 212 which includes a connecting hole 2120 in communication with the second receiving chamber 210.

The quick lock device 22 includes a quick release member 220 and an elastic member 221. The quick release member 220 includes a plurality of quick release blocks 2200. At a center of each of the quick release blocks 2200 is formed an arc-shaped groove 2201, and the elastic member 221 is received in the arc-shaped groove 2201 to clamp the quick release blocks 2200 together.

The fixing assembly 23 includes a first fixing member 230 which is provided with an outer threaded section 2300, and a second fixing member 231 which is provided with an inner threaded hole 2310 for meshing with the outer threaded section 2300.

The mobile power source 24 is electrically connected to an electric operating portion 240 which includes an output port 2400 and an input port 2401 which are electrically connected to the mobile power source 24.

The cover 25 includes an inner threaded portion 250 for meshing with the outer threaded portion 211 of the housing 21.

In assembly, the housing 21 is placed in the first receiving chamber 11 of the steering pipe 10, then the quick lock device 22 is mounted on the connecting portion 212 of the housing 21, the first fixing member 230 is inserted through the second receiving chamber 210 and exposed out of the connecting portion 212 to lock with the quick lock device 22, and the outer threaded section 2300 of the first fixing member 230 is screwed in the inner threaded hole 2310 of the second fixing member 231.

After that, a tool T is inserted in the second receiving chamber 210 of the housing 21 to rotate the first fixing member 230 until the outer threaded section 2300 of the first fixing member 230 is screwed in the inner threaded hole 2310 of the second fixing member 231. The first fixing member 230 is pushed against the quick lock device 22, and the quick release blocks 2200 of the quick lock device 22 are pushed outwardly by the first fixing member 230 to press against the inner surface of the steering pipe 10, so that the mobile power pack 20 is fixed in the first receiving chamber 11 of the steering pipe 10 by the housing 21.

Finally, the mobile power source 24 is put into the second receiving chamber 210 of the housing 21, and then the inner threaded portion 250 of the cover 25 is engaged with the outer threaded portion 211 of the housing 21, so that the mobile power pack 20 is assembled onto the steering pipe 10.

When the mobile power pack 20 is fixed onto the steering pipe 10, the output port 2400 of the electric operating portion 240 can be provided for connection of various external 3C products, which makes the bicycle more practical. When the mobile power source 24 runs out of power, it can be recharged by connecting external power source to the input port 2401.

If the mobile power source 24 is out of use, the rider can use the tool T to reversely rotate the first fixing member 230 to make the outer threaded section 2300 move out of the inner threaded hole 2310 of the second fixing member 231, then the quick release blocks 2200 of the quick lock device 22 will retract to leave a space S between the quick release blocks 2200 and the inner surface of the steering pipe 10, so that the mobile power source 24 can be pulled out from the housing 21 and replaced with a new mobile power source 24.

The mobile power pack 20 fixed in the steering pipe 10 of the bicycle has the following advantages:

The output port 2400 of the electric operating portion 240 can be provided for connection of various external 3C products, such as mobile phone, personal stereo or ipad, which allows the riders to enjoin music while riding, or to watch film when not riding.

When the mobile power source 24 runs out of power, it can be recharged by connecting external power source to the input port 2401.

The mobile power source 24 is placed in the housing 21, so that the housing 21 can protect the mobile power source 24 from water when riding in a rainy day.

The cover 25 is screwed to the electric operating portion 240 and fixed to the housing 21, and only removed when it needs to connect a 3C product or recharge the mobile power source 24. Therefore, the cover 25 can protect the mobile power source 24.

The connecting portion 212 includes a connecting hole 2120 in communication with the second receiving chamber 210, and the second fixing member 231 includes the inner threaded hole 2310. If water accidently comes into the second receiving chamber 210 of the housing 21, it can be drained from the connecting hole 2120 and the inner threaded hole 2310, so as to avoid wetting the mobile power source 24.

While we have shown and described various embodiments in accordance with the present invention, it is clear to those skilled in the art that further embodiments may be made without departing from the scope of the present invention.

What is claimed is:

1. A mobile power pack fixed in a steering pipe of a bicycle, the steering pipe comprising a first receiving chamber with an open end, the mobile power pack comprising: a housing, a quick lock device, a fixing assembly, a mobile power source and a cover; wherein the housing is received in the first receiving chamber of the steering pipe, and includes a second receiving chamber, an outer threaded portion is formed at the top of the housing, a connecting portion is formed at a bottom of the housing and includes a connecting hole in communication with the second receiving chamber;

the quick lock device is mounted on the connecting portion of the housing, and includes a quick release member and an elastic member, the quick release member includes a plurality of quick release blocks, an arc-shaped groove is formed at a center of each of the quick release blocks, the elastic member is received in the arc-shaped groove to clamp the quick release blocks together, the quick release blocks are pushed outward to press against an inner surface of the steering pipe, so that the mobile power pack is fixed in the first receiving chamber of the steering pipe by the housing;

the fixing assembly includes a first fixing member which is provided with an outer threaded section, and a second fixing member which is provided with an inner threaded hole for meshing with the outer threaded section, the first fixing member is inserted through the second receiving chamber and exposed out of the connecting portion to lock with the quick lock device, the outer threaded section of the first fixing member is screwed in the inner threaded hole of the second fixing member;

the mobile power source is disposed in the second receiving chamber and electrically connected to an electric operating portion which includes an output port and an input port, and the output port and the input port are electrically connected to the mobile power source; and the cover includes an inner threaded portion for meshing with the outer threaded portion of the housing.

2. The mobile power pack as claimed in claim 1, wherein the output portion of the electric operating portion is used to connect a 3C product.

3. The mobile power pack as claimed in claim 1, wherein the input portion of the electric operating portion is used to connect an external power source.

4. The mobile power pack as claimed in claim 1, wherein a tool is inserted in the second receiving chamber of the housing to rotate the first fixing member until the outer threaded section of the first fixing member is screwed in the inner threaded hole of the second fixing member, the first fixing member is pushed against the quick lock device, and the quick release blocks of the quick lock device are pushed outward by the first fixing member to press against an inner surface of the steering pipe, so that the mobile power pack is fixed in the first receiving chamber of the steering pipe by the housing.

5. The mobile power pack as claimed in claim 1, wherein a tool is used to reversely rotate the first fixing member to make the outer threaded section move out of the inner threaded hole of the second fixing member, then the quick release blocks of the quick lock device retracts to leave a space between the quick release blocks and the inner surface of the steering pipe, so as to allow the mobile power source to be pulled out from the housing.

\* \* \* \* \*